United States Patent
Gotmare et al.

(10) Patent No.: US 12,400,068 B2
(45) Date of Patent: Aug. 26, 2025

(54) SYSTEMS AND METHODS FOR NATURAL LANGUAGE CODE SEARCH

(71) Applicant: Salesforce, Inc., San Francisco, CA (US)

(72) Inventors: Akhilesh Deepak Gotmare, Singapore (SG); Junnan Li, Singapore (SG); Chu Hong Hoi, Singapore (SG)

(73) Assignee: Salesforce, Inc., San Francisco, CA (US)

( * ) Notice: Subject to any disclaimer, the term of this patent is extended or adjusted under 35 U.S.C. 154(b) by 301 days.

(21) Appl. No.: 17/587,984

(22) Filed: Jan. 28, 2022

(65) Prior Publication Data

US 2023/0109681 A1 Apr. 13, 2023

Related U.S. Application Data

(60) Provisional application No. 63/252,393, filed on Oct. 5, 2021.

(51) Int. Cl.
*G06F 40/151* (2020.01)
*G06F 40/30* (2020.01)
*G06F 40/40* (2020.01)
*G06N 3/04* (2023.01)

(52) U.S. Cl.
CPC ............ *G06F 40/151* (2020.01); *G06F 40/30* (2020.01); *G06F 40/40* (2020.01); *G06N 3/04* (2013.01)

(58) Field of Classification Search
None
See application file for complete search history.

(56) References Cited

U.S. PATENT DOCUMENTS

| | | | | |
|---|---|---|---|---|
| 11,132,512 B2* | 9/2021 | Wu | ........................ | G06N 3/044 |
| 11,734,339 B2* | 8/2023 | Kale | ........................ | G06F 18/21 |
| | | | | 707/722 |
| 2012/0254143 A1* | 10/2012 | Varma | ..................... | G06F 40/30 |
| | | | | 707/706 |
| 2020/0117446 A1* | 4/2020 | Smith | ....................... | G06F 8/71 |
| 2020/0334520 A1* | 10/2020 | Chen | ........................ | G06F 40/20 |
| 2021/0191696 A1* | 6/2021 | Ibarra Von Borstel | ... | G06F 8/36 |
| 2021/0303989 A1* | 9/2021 | Bird | ......................... | G06F 16/95 |
| 2023/0042051 A1* | 2/2023 | Clement | ................. | G06N 3/091 |

(Continued)

OTHER PUBLICATIONS

CoSQA: 20,000+ Web Queries for Code Search and Question Answering, arXiv:2105.13239v1 (Year: 2021).*

(Continued)

*Primary Examiner* — Paras D Shah
*Assistant Examiner* — Nadira Sultana
(74) *Attorney, Agent, or Firm* — Haynes and Boone, LLP

(57) ABSTRACT

Embodiments are directed to translating a natural language query into a code snippet in a programing language that semantically represents the query. The embodiments include a cascading neural network that includes an encoder network and a classifier network. The encoder network being faster but less accurate than the classifier network. The encoder network is trained using a contrastive learning framework to identify code candidates from a large set of code snippets. The classifier network is trained using a binary classifier to identify the code snippet that semantically represents the query from the code candidates.

20 Claims, 4 Drawing Sheets

(56) References Cited

U.S. PATENT DOCUMENTS

2023/0100376 A1* 3/2023 Liu .................. G06F 40/30
704/9

OTHER PUBLICATIONS

Lobato, "Neural networks with optimal accuracy and speed in their predictions," Toward Data Science.com, Jul. 20, 2017 (available at: https://towardsdatascience.com/neural-networks-with-optimal-accuracy-and-speed-in-their-predictions-d2cdc3b21b50) (Year: 2017).*

Pengcheng Yin, Bowen Deng, Edgar Chen, Bogdan Vasilescu, Graham Neubig, "Learning to Mine Aligned Code and Natural Language Pairs from Stack Overflow", 2018, IEEE, ACM/IEEE 15th International Conference on Mining Software Repositories, pp. 476-486 (Year: 2018).*

International Search Report and Written Opinion for PCT/US2022/077458, dated Jan. 4, 2023, 11 pages.

Gotmare et al., "Cascaded Fast and Slow Models for Efficient Semantic Code Search", arXiv.Org., Cornell University Library, 201 Olin Library Cornell University Ithaca, NY 14853, Oct. 15, 2021, XP091077176, pp. 1-12.

Guo et al., "GraphCodeBert: Pre-Training Code Representations with Data Flow", Published as conference paper at ICLR 2021, Sep. 13, 2021, Retrieved from the Internet: URL:https://arxiv.org/pdf/2009.08366.pdf, pp. 1-18.

Salza et al., "On the Effectiveness of Transfer Learning for Code Search", arXiv.Org., 201 Olin Library Cornell University Ithaca, NY 14853, Aug. 12, 2021, XP091032288, 16 pages.

* cited by examiner

SYSTEMS AND METHODS FOR NATURAL LANGUAGE CODE SEARCH

CROSS-REFERENCE TO RELATED APPLICATIONS

This application is a nonprovisional of and claims priority under 35 U.S.C. 119 to U.S. Provisional Application No. 63/252,393, filed Oct. 5, 2021, which is hereby expressly incorporated by reference herein in its entirety.

TECHNICAL FIELD

The embodiments relate generally to machine learning systems and natural language processing (NLP), and more specifically to searching code snippets using natural language.

BACKGROUND

Artificial intelligence (AI) models have been widely used in a variety of applications. Some AI models may be used to search and/or generate code snippets in programming languages in response to a natural language input. For example, a natural language input may describe a function such as "filter the sales records that occurred at the zip code 94070," and the AI model may generate or search a code segment (e.g., in Python, C#, etc.) that implements this function. Existing code generation systems have focused on either improving the speed of natural language search or on improving the accuracy of the natural language search. However, these existing natural language search methods largely struggle with a tradeoff between efficiency and exhaustiveness of the search.

Figure 1:
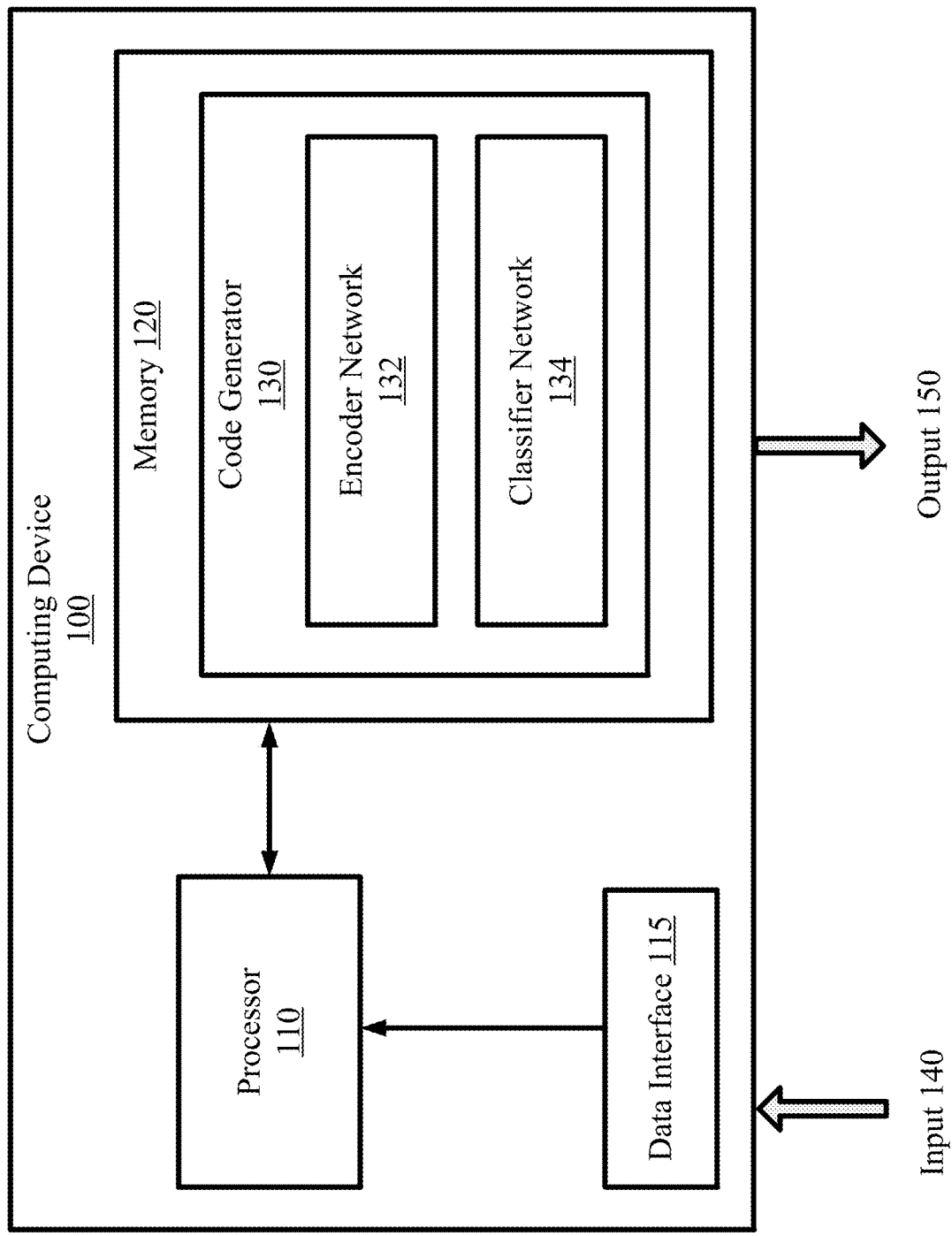
FIG. 1 is a simplified diagram of a computing device that implements a code generator, according to some embodiments.

In the figures, elements having the same designations have the same or similar functions.

DETAILED DESCRIPTION

Natural language queries are being used to improve search in different areas, e.g., web search, database search, legal search, and/or the like. There is also interest in searching large sets of code snippets using natural language queries. Organizations that have large code repositories may benefit from indexing and searching through the code and reuse code that is known to function properly. Some recent approaches to natural language search of code and code snippets leverage pairs of natural language and source code sequences to train a text-to-code search model to search a sample of code snippets.

One approach to train the model includes using a contrastive learning framework. The model may be a fast encoder neural network, also referred to as a fast encoder. In the contrastive learning framework, pairs of natural language and program language sequences that semantically match are pulled together while pairs that do not semantically match are pushed apart. Fast encoder networks may use contrastive learning. Fast encoders networks may be efficient for scenarios that include searching a large number of candidate code snippets at the expense of accuracy in semantics matching.

Another approach to train a model uses a binary classifier. This type of a model uses a trained binary classifier that receives a natural language and programing language sequences as inputs and predicts whether the natural language and programming language sequences match semantically. Models using binary classifiers may be considered slow classifiers. Slow classifiers, while more accurate, become infeasible when searching a large number of candidate code snippets due to an amount of time the models take to analyze the code snippets against the natural language sequence. In other words, models trained using contrastive learning framework may be faster by at least a factor of ten, but may also be less accurate by at least a factor of ten or more than models that use a binary classifier.

To improve natural language searching of large numbers of code snippets, embodiments are directed to a cascading neural network model that includes both fast encoder model and an accurate classifier model. The cascading neural network model provides improved natural language search efficiency of large sets of code snippets. Specifically, the cascading neural network model is a hybrid approach that combines a fast encoder network and a slow classifier network. First, the encoder network determines a top K code candidates from the set of code snippets based on a natural language query. Second, the top K code candidates are passed through a slow classifier network that pairs each of the code candidates with the natural language query and generates confidence scores for each pair. The code snippet with a highest confidence score may be the code snippet that semantically matches the natural language query.

The number K may denote a threshold that identifies the number of code candidates that the encoder network may generate. The K threshold is preferably much smaller than the size of the set of code snippets. If the K threshold is too small there is an increased likelihood of missing the correct code snippet and if K threshold is too large it may be infeasible to efficiently run the second stage slow classifier.

In some embodiments, memory overhead for storing a fast encoder network and a slow classifier network may be minimized by sharing or partially sharing the weights of the network. For example, a transformer encoder of the fast encoder and slow classifier may be shared by training the transformer encoder to be used by both the fast encoder network and the slow classifier network.

As used herein, the term "network" may comprise any hardware or software-based framework that includes any artificial intelligence network or system, neural network or system and/or any training or learning models implemented thereon or therewith.

As used herein, the term "module" may comprise hardware or software-based framework that performs one or more functions. In some embodiments, the module may be implemented on one or more neural networks.

FIG. 1 is a simplified diagram of a computing device that implements a code generator, according to some embodiments described herein. As shown in FIG. 1, computing device 100 includes a processor 110 coupled to memory 120. Operation of computing device 100 is controlled by processor 110. And although computing device 100 is shown with only one processor 110, it is understood that processor 110 may be representative of one or more central processing units, multi-core processors, microprocessors, microcontrollers, digital signal processors, field programmable gate arrays (FPGAs), application specific integrated circuits (ASICs), graphics processing units (GPUs) and/or the like in computing device 100. Computing device 100 may be implemented as a stand-alone subsystem, as a board added to a computing device, and/or as a virtual machine.

Memory 120 may be used to store software executed by computing device 100 and/or one or more data structures used during operation of computing device 100. Memory 120 may include one or more types of machine readable media. Some common forms of machine readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Processor 110 and/or memory 120 may be arranged in any suitable physical arrangement. In some embodiments, processor 110 and/or memory 120 may be implemented on a same board, in a same package (e.g., system-in-package), on a same chip (e.g., system-on-chip), and/or the like. In some embodiments, processor 110 and/or memory 120 may include distributed, virtualized, and/or containerized computing resources, as well as multiple processors. Consistent with such embodiments, processor 110 and/or memory 120 may be located in one or more data centers and/or cloud computing facilities.

In some examples, memory 120 may include non-transitory, tangible, machine readable media that includes executable code that when run by one or more processors (e.g., processor 110) may cause the one or more processors to perform the methods described in further detail herein. For example, as shown, memory 120 includes instructions for a natural language (NL) processing module, such as a code generator 130 that may be used to implement and/or emulate the systems and models, and/or to implement any of the methods described further herein. In some examples, the code generator 130, may receive an input 140, e.g., such as natural language text or query or computer code, via a data interface 115. The data interface 115 may be any of a user interface that receives input 140 from a user, or a communication interface that receives or retrieves input 140 stored in memory 120 or another memory storage such as a database. The code generator 130 may generate an output 150, such as a programmable language (PL) sequence, code, or code snippet that is semantically equivalent to the natural language text or query. In some embodiments, code generator 130 may include a cascading neural network that includes an encoder network 132 and a classifier network 134, such that the output of encoder network 132 may be input, in part, into classifier network 134.

Figure 2:
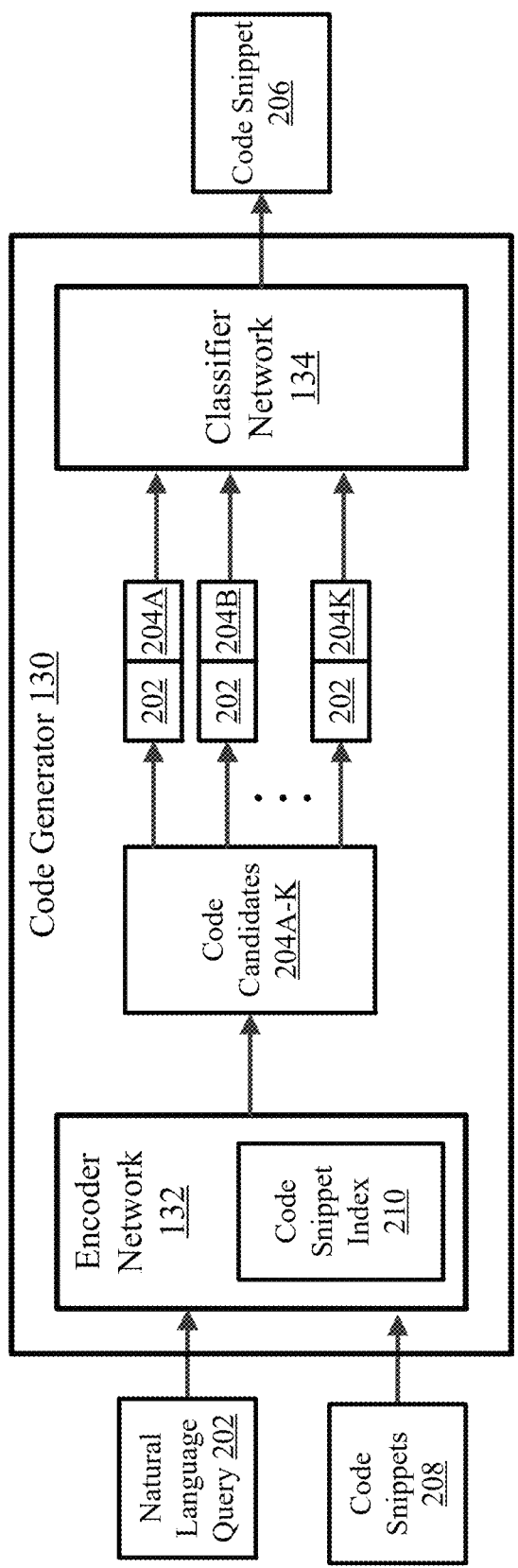
FIG. 2 is a simplified diagram of a code generator, according to some embodiments.

FIG. 2 is a block diagram 200 of a code generator, according to some embodiments. As illustrated in FIG. 2, the code generator 130 includes encoder network 132 and classifier network 134. The code generator 130 receives a natural language query 202 in a natural language query or text. Natural language query 202 may be input 140 discussed in FIG. 1. The natural language query 202 may be a human written or spoken text, such as "filter the sales records that occurred at the zip code 94070" that code generator 130 may translate into a programming language sequence, such as a code snippet. The code generator 130 passes natural language query 202 through encoder network 132. Encoder network 132 may generate a K number of code candidates 204A-K. The code candidates 204A-K may be code snippets in a programming language that may semantically represent and/or semantically match the natural language query 202. The classifier network 134 may receive pairs of code candidates 204A-K the natural language query 202. Each pair in the pairs may include one of candidates 204A-K and natural language query 202. Classifier network 134 may generate a code snippet 206 that is a semantic representation of the natural language query 202.

In some embodiments, encoder network 132 is substantially faster, e.g. at least by a factor of ten or more, than the classifier network 134. In fact, due to speed of the encoder network 132, encoder network 132 may quickly determine code candidates 204A-K from a large set of available code snippets. The classifier network 134, on the other hand, is slower than encoder network 132, but is substantially more accurately, e.g., at least by at least a factor of ten or more, in identifying a code snippet that semantically matches the natural language query 202. As illustrated in FIG. 2, classifier network 134 receives pairs of code candidates 204A-K and natural language query 202 and identifies code snippet 206 that is a semantic representation of the natural language query 202. By using the hybrid approach that includes encoder network 132 and classifier network 134, code generator 130 improves the speed and accuracy for determining the code snippet 206 that is a semantic representation of the natural language query 202.

In some embodiments, encoder network 132 may be or include a bidirectional encoder representations from transformers (BERT) network or a variant of a BERT network. The BERT network or a variant of the BERT network may be pre-trained on programming language sequences in a variety of programming languages to retrieve code snippets from text input. Example pre-trained BERT networks may be GraphCodeBERT or CodeBERT. An example programing languages may be Ruby, JavaScript, Go, Python, Java, C, C++, C#, Php, or the like. During a training phase, to recognize code candidates 204, encoder network 132 may further be trained on a the contrastive learning framework using a bimodal dataset. In the bimodal dataset, the positive pairs, that are representations of natural language queries and programming language sequences that match in semantics are pulled together. On the other hand, representations of negative pairs, that are randomly paired natural language queries and programing language sequences, are pushed apart. A contrastive loss function, such as the infoNCE loss function may be used to train encoder network 132, and is replicated below:

$$\mathcal{L}_{infoNCE} = \frac{1}{N}\sum_{i=1}^{N} -\log \frac{\exp(f_\theta(x_i)^T f_\theta y_i / \sigma)}{\sum_{j \in B} \exp(f_\theta(x_i)^T f_\theta y_j / \sigma)} \quad (1)$$

where $f_\theta(x_i)$ is the dense representation for the natural language input $x_i$, $y_i$ is the corresponding semantically equivalent programming language sequence, N is the number of training examples in the bimodal dataset, $\sigma$ is a temperature hyper-parameter, and B denotes the current training minibatch. The encoder network 132 may be trained until the contrastive loss function is minimized.

Once trained, encoder network 132 may receive a set of candidate code snippets C={$\mathcal{Y}_1$, $\mathcal{Y}_2$, ... $\mathcal{Y}_{|C|}$}, shown as code snippets 208. Code snippets 208 may include potential code snippets, universe of code snippets, available code snippets., etc., that may correspond to various natural language queries. Code snippets 208 may be encoded into an index $\{f_\theta(\mathcal{Y}_j)\forall_j \in C\}$, shown as code snippet index 210. Code snippet index 210 may be an index of the encodings of each code snippet in code snippets 208. Encoder network 132 may encode the set of code snippets offline, e.g., prior to receiving natural language query 202 from which code generator 130 determines code snippet 206. Code snippet index 210 may be stored within encoder network 132 or elsewhere in memory 120 described in FIG. 1.

In some embodiments, after generating the code snippet index 210, encoder network 132 may receive a natural query $x_i$ (natural language query 202), compute $f_\theta(x_i)$, query the code snippet index 210, and return the code snippet from C (code snippets 208) corresponding to the nearest neighbor or neighbors in the code snippet index 210. The neighbor(s) may be computed using a distance metric determined by a similarity function, e.g., a cosine similarity function. The rank $r_i$ assigned to the correct code snippet from the set of code snippets C (code snippets 208) for the natural language query $x_i$ may then be used to compute the mean reciprocal ranking (MRR) metric $$\frac{1}{N_{test}} \sum_{i=1}^{N_{test}} \frac{1}{r_i}.$$

From the MRR metric, the code candidates 204 with a rank included in the MRR or a certain distance from the rank in the MRR may be determined. In some embodiments, the number of code candidates 204 may be governed by a hyperparameter K which may be a threshold values that cause encoder network 132 to identify the top K candidates, e.g. code candidates 204A-K.

In some embodiments, classifier network 134 may also be or include a bidirectional encoder representations from transformers (BERT) network or a variant of BERT network. The BERT network or a variant of the BERT network may be pre-trained on programming language sequences to retrieve code snippets from text input. Example pre-trained BERT networks may be GraphCodeBERT or CodeBERT and an example programing language languages may be Ruby, JavaScript, Go, Python, Java, C, C++, C#, Php, or the like.

Classifier network 134 may receive natural language query $x_i$ (shown as 202) and a programming language sequence $\mathcal{Y}_j$ (one of code candidates 204A-K or another code sequence) as input, encode the natural language input $x_i$ and the code sequence jointly and perform binary classification. The binary classification may predict whether the natural language input $x_i$ and a code sequence $\mathcal{Y}_j$ match or does not match in semantics. In some embodiments, classifier network 134 may receive a concatenation of the natural language input $x_i$ and a code sequence $\mathcal{Y}_j$, such as $[x_i; \mathcal{Y}_j]$.

Classifier network 134 may be trained for binary classification using training batches. The training batches may include pairs where each pair includes a natural language query and a code snippet. The training batches may be batches for a bimodal dataset where positive pairs denote semantic matches between the natural language query and the code snippet and the negative pairs denote semantic mismatches. Given a set of pairs that include natural language query and a semantically programming language sequence $\{x_i, \mathcal{Y}_i\}_{i=1}^N$, the cross-entropy objective function for this training scheme may be:

$$\mathcal{L}_{CE} = -\frac{1}{N} \sum_{i=1, j\neq i}^{N} \log p_\theta(x_i, \mathcal{Y}_i) + \log(1 - \mathcal{P}_\theta(x_i, \mathcal{Y}_j)) \quad (2)$$

where $p_\theta(x_i, \mathcal{Y}_j)$ represents the probability that the natural language sequence $x_i$ semantically matches the programming language sequence $\mathcal{Y}_j$, as predicted by the classifier. Classifier network 134 may be trained until the cross-entropy objective function is minimized.

From a training minibatch of positive pairs $\{x_i, \mathcal{Y}_i\} \forall i \in B$, a training batch of negative pairs may be generated. For example, a negative pair may be generated by randomly selecting a programming language sequence $\mathcal{Y}_j (j \in B; j \neq i)$ from the programming language sequences in the minibatch and pairing the selected sequence with $x_i$. When classifier network 134 includes a transformer encoder based classifier, the interactions between the natural language tokens and programming language tokens in the self-attention layers may help in improving the precision of the classifier network 134.

Once trained, classifier network 134 may determine code snippet 206 from natural language query 202 and code candidates 204. For example, during inference, classifier network 134 may receive multiple pairs as inputs, each pair including the natural language sequence $x_i$ (e.g. natural language query 202) with a code snippet $\mathcal{Y}_j$ (one of code candidates 204A-K) from a set of candidate code snippets $C=\{\mathcal{Y}_1, \mathcal{Y}_2, \ldots \mathcal{Y}_{|C|}\}$ (code candidates 204A-K). Classifier network 134 may generate a confidence score for each pair and rank each code candidate in the code candidate 204A-K according to the confidence scores. The confidence score may be a probability having a measure, e.g., from zero to one, with the values closer to one indicating a greater probability of a match, and the values closer to zero indicating a greater probability of a mismatch. The code snippet $\mathcal{Y}_j$ (a code candidate in the code candidates 204A-K) that corresponds to a pair with the highest score may be a semantic match with the natural language sequence $x_i$ (natural language query 202).

As discussed above, the code generator 130 discussed herein includes a cascade of networks, such as encoder network 132 and classifier network 134 which combines the speed of the fast encoder network 132 with precision of the classifier network 134 in a two stage process. In the first stage, encoder network 132 receives natural language query 202 and generates code candidates 204A-K from the set of code snippets C (code snippets 208). Encoder network 132 may determine encodings of the natural language query 202 and match the encodings against the code snippet index 210 of the code snippet 208 using a distance function. In some embodiments, encoder network 132 may determine a K number of code candidates 204A-K where K is a configurable candidate threshold that may be a hyperparameter. Typically, the K number of candidates are the top candidates that have the closest distance in the code snippet index 210 to the encodings of the natural language query 202.

In the second stage, the code candidates 204 are paired with the natural language query 202. Example pairs may be 202-204A, 202-204B, . . . , 202-204K. Classifier network 134 receives pairs 202-204A, 202-204B, . . . , 202-204K. For each pair in pairs 202-204A, 202-204B, . . . , 202-204K, classifier network 134 returns a confidence score that the natural language query 202 semantically matches a corresponding one of code candidates 204A-K using a binary classifier. Based on the confidence scores associated with pairs 202-204A, 202-204B, ..., 202-204K, classifier network 134 selects the code snippet 206 that semantically matches the natural language query 202. In some instances, code snippet 206 may correspond to a pair having a highest confidence score.

As discussed above, encoder network 132, while computationally faster is also less accurate, in determining a code snippet that semantically matches natural language query, than classifier network 134. In a scheme where K«|C|, adding classifier network 134 in sequence with encoder network 132 may add a minor computational overhead. The second stage where classifier network 134 refines code candidates 204A-K improves the retrieval performance provided that the value of K is set such that the recall of the encoder network 132 is reasonably high. In some embodiments, K may be a hyperparameter. Setting a very low K would lead to high likelihood of missing the code snippet 206 in the set of code candidates 204 passed to classifier network 134. On the other hand, setting a high K would make the scheme infeasible for retrieval with the classifier network 134. However, setting K to a value, such as ten, already offers significant gains in retrieval performance over conventional code generation systems, which only marginal gains when K is set to 100 and above.

In some embodiments, encoder network 132 and classifier network 134 may share a portion of a neural network structure. For example, encoder network 132 and classifier network 134 may share weights of the layers in the transformer encoder in the BERT network. Sharing the neural network structure minimizes a memory overhead incurred by encoder network 132 and classifier network 134. Sharing the neural network structure, e.g. transformer layers, by encoder network 132 and classifier network 134 may be achieved by training the transformer encoder with a joint objective of infoNCE ($\mathcal{L}_{infoNCE}$) shown in Eq. (1) and binary cross-entropy ($\mathcal{L}_{NE}$) shown in Eq. (2). While the number of parameters in this shared variant would be nearly half of when the transformer layers are not shared, the computational cost during the inference may be similar or the same.

In the shared embodiment, the classifier network 134 may have an additional classification layer or head that determines confidence scores for the pairs 202-204A, 202-204B, ..., 202-204K. Classifier network 134 would include the classification head on top of the transformer encoder. Further, the shared neural network structure may receive three inputs, natural language query 202, set of candidate code snippets C (code snippets 208), and pairs 202-204A, 202-204B, ..., 202-204K. In the shared embodiment, two passes are made through the shared layers of the network, where the natural language query 202 is an input during a first pass, and pairs 202-204A, 202-204B, ..., 202-204K are input during a second pass.

Figure 3:
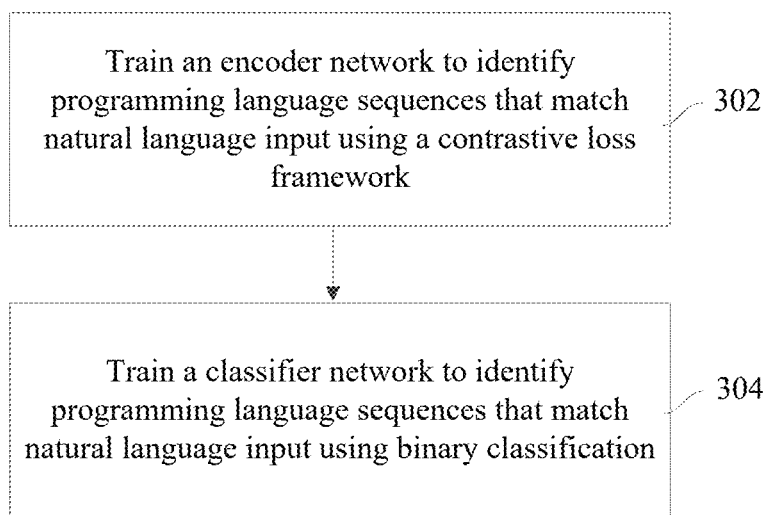
FIG. 3 is a simplified diagram of a method for training the code generator, according to some embodiments.

FIG. 3 is a simplified diagram of a method 300 for training a code generator, according to some embodiments. One or more of the processes 302-304 of method 300 may be implemented, at least in part, in the form of executable code stored on non-transitory, tangible, machine-readable media that when run by one or more processors may cause the one or more processors to perform one or more of the processes 302-304.

At process 302, an encoder network is trained. For example, encoder network 132 that may be a pre-trained BERT network may further be trained on a contrastive learning framework to identify code snippets that semantically matches the natural language sequences. The contrastive loss function used to train encoder network 132 may be a contrastive loss function, such as infoNCE loss function. The training may include batches of negative and positive pairs, each pair including a natural language sequence and a programming language sequence. The training may continue iteratively until the infoNCE loss function is minimized.

At process 304, a classifier network is trained. For example, classifier network 134 that may be a pre-trained BERT network may be trained on binary classification to determine a probability score that the code snippets match the natural language sequences. The cross-entropy objective function may be is used to train classifier network 134. The training may include batches of negative and positive pairs, each pair including a natural language sequence and a programming language sequence. The training may continue iteratively until the cross-entropy objective function is minimized.

Figure 4:
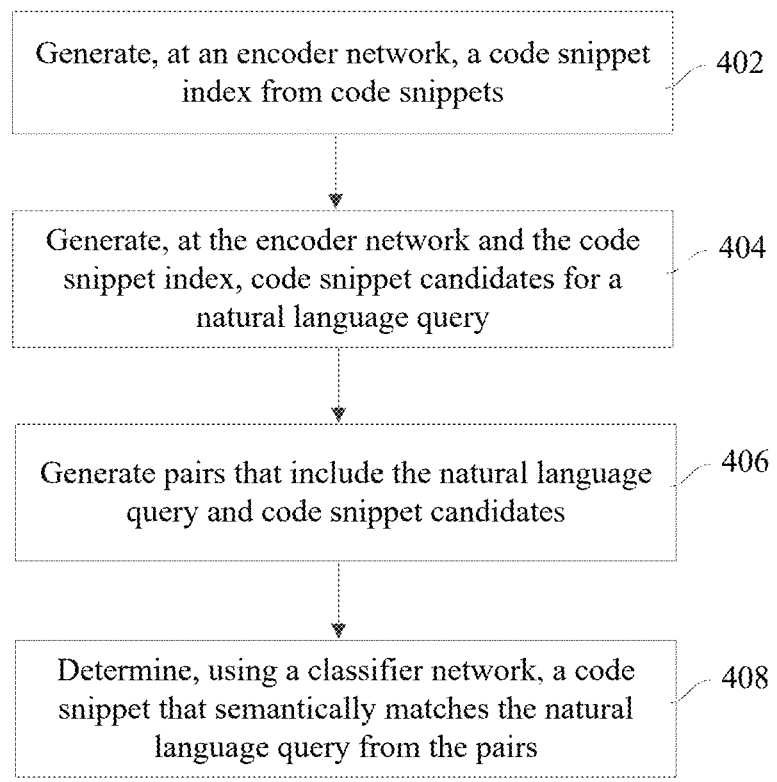
FIG. 4 is a simplified diagram of a method for determining a code snippet that is semantically equivalent to a natural language query, according to some embodiments.

FIG. 4 is a simplified diagram of a method 400 for generating a code snippet that is semantically equivalent to a natural language query, according to some embodiments. One or more of the processes 402-408 of method 400 may be implemented, at least in part, in the form of executable code stored on non-transitory, tangible, machine-readable media that when run by one or more processors may cause the one or more processors to perform one or more of the processes 402-408.

At process 402, a code snippet index is generated. For example, encoder network 132 receives code snippets 208 that may semantically correspond to numerous natural language queries. Encoder network 132 encodes the code snippets 208 and generates a code snippet index 210 that corresponds to the encoded code snippets. Process 402 may occur after encoder network 132 is trained and prior to encoder network 132 processing natural language query 202.

At process 404, code candidates for a natural language query are generated. For example, encoder network 132 may receive natural language query 202 and generate encodings for the natural language query 202. Encoder network 132 may use the code snippet index 210 to match the encodings of the natural language query 202 to encodings of code snippets 208 to identify code candidates 204A-K that may semantically match natural language query 202. As discussed above, the number of code candidates 204A-K may be set using a number K which may be a hyperparameter.

At process 406, pairs that include natural language query and code candidates are generated. For example, code generator 130 may generate pairs 202-204A, 202-204B, ..., 202-204K, where each pair includes natural language query 202 and one of code candidates 204A-K.

At process 408, a code snippet is determined. For example, classifier network 104 may receive the pairs 202-204A, 202-204B, ..., 202-204K and determine a confidence score for each pair. The pair with a highest confidence score may be code snippet 206 that semantically matches natural language query 202.

Some examples of computing devices, such as computing device 100 may include non-transitory, tangible, machine readable media that include executable code that when run by one or more processors (e.g., processor 110) may cause the one or more processors to perform the processes of methods 300-400. Some common forms of machine readable media that may include the processes of methods 300-400 are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

This description and the accompanying drawings that illustrate inventive aspects, embodiments, implementations, or applications should not be taken as limiting. Various mechanical, compositional, structural, electrical, and operational changes may be made without departing from the spirit and scope of this description and the claims. In some instances, well-known circuits, structures, or techniques have not been shown or described in detail in order not to obscure the embodiments of this disclosure. Like numbers in two or more figures represent the same or similar elements.

In this description, specific details are set forth describing some embodiments consistent with the present disclosure. Numerous specific details are set forth in order to provide a thorough understanding of the embodiments. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A method for translating a natural language query into a code snippet in a programming language, the method comprising:
    generating, at an encoder network, a plurality of code snippet indices and a natural language query representation from a plurality of code snippets and the natural language query, respectively;
    determining one or more code candidates based on distance metrics between the natural language query representations and the plurality of code snippet indices;
    generating text-code pairs from the natural language query and the determined one or more code candidates based on the distance metrics, a text-code pair including the natural language query and a code candidate from the determined one or more code candidates;
    jointly encoding, by a single encoder of a classifier network, an input sequence concatenating the natural language query and the code candidate from the text-code pair into one joint representation, wherein the single encoder and the encoder network share one or more encoder layers;
    predicting, by a classification head of the classifier network, a matching probability that the natural language query and the code candidate are a match using an input of the one joint representation outputted from the single encoder; and
    outputting the code candidate in the programming language in response to the natural language query based on the matching probability.

2. The method of claim 1, further comprising:
    training, the encoder network to determine the code candidates on a contrastive loss function.

3. The method of claim 1, further comprising:
    training, the classifier network to determine the code snippet from the pairs using a cross-entropy objective function.

4. The method of claim 1, wherein the classifier network sequentially follows the encoder network, and the encoder network is an order of magnitude faster and an order of magnitude less accurate than the classifier network.

5. The method of claim 1, wherein the encoder network is trained on a different loss function from the classifier network.

6. The method of claim 1, wherein the encoder network shares a portion of a neural network structure with the classifier network.

7. The method of claim 1, wherein generating the code candidates further comprises:
    generating encodings from the natural language query; and
    determining, using the code snippet index, the encodings of the code candidates that are within a distance determined by a distance function from the encodings of the natural language query.

8. The method of claim 1, wherein determining the code snippet further comprises:
    determining a confidence score that a code candidate of each pair is the semantic representation of the natural language query;
    ranking confidence scores of the pairs; and
    selecting a code candidate of a pair corresponding to a highest confidence score as the code snippet that is the semantic representation of the natural language query.

9. A system for translating a natural language query into a code snippet in a programming language, the system comprising:
    a memory configured to store a cascading neural network;
    a processor coupled to the memory and configured to execute instructions for causing the cascading neural network to:
        generate, at an encoder network of the cascading neural network, a plurality of code snippet indices and a natural language query representation from a plurality of code snippets and the natural language query, respectively;
        determine one or more code candidates based on distance metrics between the natural language query representation and the plurality of code snippet indices;
        generate text-code pairs from the natural language query and the determined one or more code candidates based on the distance metrics, a text-code pair including the natural language query and a code candidate from the determined one or more code candidates;
        jointly encode, by a single encoder of a classifier network, an input sequence concatenating the natural language query and the code candidate from the text-code pair into one joint representation, wherein the single encoder and the encoder network share one or more encoder layers;
        predict, by a classification head of the classifier network, a matching probability that the natural language query and the code candidate are a match using an input of the one joint representation outputted from the single encoder; and output the code candidate in the programming language in response to the natural language query, based on the matching probability.

10. The system of claim 9, wherein the processor is further configured to:

train, the encoder network to determine the code candidates on a contrastive loss function; and train, the classifier network to determine the code snippet from the pairs using a cross-entropy objective function.

11. The system of claim 9, wherein the classifier network sequentially follows the encoder network, and the encoder network is an order of magnitude faster and an order of magnitude less accurate than the classifier network.

12. The system of claim 9, wherein the encoder network shares a portion of a neural network structure with the classifier network.

13. The system of claim 9, wherein to generate the code candidates the processor is further configured to:

generate encodings from the natural language query; and determine, using the code snippet index, encodings of the code candidates that are within a distance determined by a distance function from the encodings of the natural language query.

14. The system of claim 9, wherein to determine the code snippet the processor is further configured to:

determine a confidence score that a code candidate of each pair is a semantic representation of the natural language query;

rank confidence scores of the pairs; and select a code candidate of a pair corresponding to a highest confidence score as the code snippet that is the semantic representation of the natural language query.

15. A non-transitory computer readable medium having instructions stored thereon, that when executed by a processor cause the processor to perform operations for translating a natural language query into a code snippet in a programming language, the operations comprising:

generating, at an encoder network, a plurality of code snippet indices and a natural language query representation from a plurality of code snippets and the natural language query, respectively;

determining one or more code candidates based on distance metrics between the natural language query representations and the plurality of code snippet indices;

generating text-code pairs from the natural language query and the determined one or more code candidates based on the distance metrics, a text-code pair including the natural language query and a code candidate from the determined one or more code candidates;

jointly encoding, by a single encoder of a classifier network, an input sequence concatenating the natural language query and the code candidate from the text-code pair into one joint representation, wherein the single encoder and the encoder network share one or more encoder layers;

predicting, by a classification head of the classifier network, a matching probability that the natural language query and the code candidate are a match using an input of the one joint representation outputted from the single encoder; and outputting the code candidate in the programming language in response to the natural language query based on the matching probability.

16. The non-transitory computer readable medium of claim 15, further comprising:

training, the encoder network to determine the code candidates on a contrastive loss function; and training, the classifier network to determine the code snippet from the pairs using a cross-entropy objective function.

17. The non-transitory computer readable medium of claim 15, wherein the classifier network sequentially follows the encoder network, and the encoder network is an order of magnitude faster and an order of magnitude less accurate than the classifier network.

18. The non-transitory computer readable medium of claim 15, wherein the encoder network shares a portion of a neural network structure with the classifier network.

19. The non-transitory computer readable medium of claim 15, wherein generating the code candidates further comprises:

generating encodings from the natural language query; and determining, using the code snippet index, encodings of the code candidates that are within a distance determined by a distance function from the encodings of the natural language query.

20. The non-transitory computer readable medium of claim 15, wherein determining the code snippet further comprises:

determining a confidence score that a code candidate of each pair is a semantic representation of the natural language query;

ranking confidence scores of the pairs; and selecting a code candidate of a pair corresponding to a highest confidence score as the code snippet that is the semantic representation of the natural language query.

* * * * *